US005740898A

United States Patent [19]

Pearson

[11] Patent Number: 5,740,898

[45] Date of Patent: Apr. 21, 1998

[54] METHOD AND APPARATUS FOR LAYING UP STRANDS

[75] Inventor: Martin Thomas Pearson, Burnaby, Canada

[73] Assignee: MacMillan Bloedel Limited, Vancouver, Canada

[21] Appl. No.: 739,079

[22] Filed: Oct. 24, 1996

[51] Int. Cl.[6] .................... B65G 47/26

[52] U.S. Cl. .................... 198/382

[58] Field of Search .................... 198/382, 588, 198/812

[56] References Cited

U.S. PATENT DOCUMENTS

| | | | |
|---|---|---|---|
| 3,115,431 | 12/1963 | Stokes | 198/382 |
| 4,666,029 | 5/1987 | Burkner | 198/382 |
| 5,054,603 | 10/1991 | Churchland et al. | 198/382 |
| 5,325,954 | 7/1994 | Crittenden et al. | 198/382 |
| 5,404,990 | 4/1995 | Barnes et al. | 198/382 |
| 5,487,470 | 1/1996 | Barnes | 198/382 |
| 5,637,183 | 6/1997 | Bosner | 198/812 X |
| 5,676,236 | 10/1997 | Barnes et al. | 198/382 |

FOREIGN PATENT DOCUMENTS

| | | |
|---|---|---|
| 9615299 | 5/1996 | WIPO . |

*Primary Examiner*—James R. Bidwell

*Attorney, Agent, or Firm*—C. A. Rowley

[57] ABSTRACT

Strand lay-up system produces a layered strand lay-up from separate feed bins and then deposits incremental lengths of the so formed layered lay-up over discrete selected area to form a more homogenous lay-up.

12 Claims, 3 Drawing Sheets

METHOD AND APPARATUS FOR LAYING UP STRANDS

FIELD OF THE INVENTION

The present invention relates to the method and apparatus for producing a lay-up, more particularly, the present invention relates to an apparatus for producing a more uniform density lay-up.

BACKGROUND OF THE INVENTION

In the manufacture of oriented strand board (OSB) panels or the like, it is generally preferred to produce a lay-up having a core that has distinctly different characteristics from that of the two surface layers either for strength purposes, i.e. if the surface layers are stronger in bending than the core layers, this strength is more effectively used close to the surface of the panel. In other cases, it is desired to have a particular surface finish which requires the positioning of the particles that will produce that finish adjacent to the faces of the finished product.

In most cases, the less desirable material is contained in the core where it is not directly visible and does not contribute significantly to the strength of the panel in bending.

In the manufacture of lumber products using oriented strand board (OSB) technology, it is more desirable to have a uniform or homogenous cross-section in the resultant composite product which may be obtained in part by using essentially the same furnish in each of the layers used to form a lay-up for an OSB product. In any of these processes, depending on the pressing, there is likely to be a hardened skin or surface layer produced during the pressing operation. These skin or high density surface areas contribute significantly to the Modulus of Elasticity (MOE) or stiffness of the end product in bending when tested via forces applied perpendicular to the face or surface of the panel.

In the manufacture of oriented strand lumber (OSL) the degree of orientation of the strands to the longitudinal axis of the product plays a significant role in defining the strength characteristics of the resultant product. Orientation of the strands is obtained generally by passing them through orienting passages. In some conventional orienters, parallel rotating disks define the sides of the orienting passages and the spacing between disks defines the passage width which contributes significantly to the degree of strand orientation, i.e. the smaller the spacing, the better the orientation. However, the degree of strand orientation is also dependent on the height of the disks above the mat or lay-up being formed and a number of other factors. Normally, the strand orientation in the manufacture of ordinary OSB products is done using a single deck of parallel disks adjacent to the surface of the mat and passing the strands between the disks. Those strands that do not immediately fall between the disks are carried along the surface of the disks towards one end of the orienter. See for example, U.S. Pat. No. 3,115,431 issued Dec. 24, 1963 to Stokes or U.S. Pat. No. 4,666,029 issued May 19, 1987 to Burkner. In the devices described in both of these patents, the rotary disks carry the longer strands that do not pass directly between the disks along the top of the disks toward one end of the orienter.

U.S. Pat. No. 5,325,954 issued Jul. 5, 1994 to Crittenden et al. describes an improved strand orienter that facilitates orientation and production of a more homogenous mat. However, the decks still tend to carry the longer strands toward one end of the orienter.

U.S. Pat. No. 5,487,470 issued Jan. 30, 1996 to Barnes describes an orienter that overcomes many of the problems of the prior art with respect to producing a more uniform density mat with the oriented strands. However, the density of the mat is obviously dependent on the uniformity of infeed to the orienter and the relative uniformity of the dispersion of the strands over the area of the infeed end of the orienter as the strands tend to pass substantially directly downward therethrough.

WO96/15299 published May 23, 1996 by Barber, discloses independently driven conveyors in sequence, each with a weighing means and each having its speed controlled based on the weight sensed thereon to meter the flow of material.

BRIEF DESCRIPTION OF THE PRESENT INVENTION

It is an object of the present invention to provide an improved lay-up system for producing a more homogenous lay-up of oriented strands into a mat.

Broadly, the present invention relates to a system for producing a lay-up of strands comprising a plurality of lay-up heads, a receiving conveyor for receiving a layer of strands formed by each of said lay-up heads to produce layered lay-up, a distributing conveyor having a variable length upper reach terminating at a free end, means to move said free end between an extended position and a retracted position and deposit selected lengths of said layered lay-up over selected distances and means for collecting said strands discharging from said free end of said distributing conveyor.

Preferably, an orienter will be positioned between said distributing conveyor and means for collecting to orient said strands passing to said mean for collecting.

Preferably, a preorienter will be positioned between each of said lay-up heads and said receiving conveyor.

Preferably, said system will further comprise means for continuous by weighing discrete lengths of said layered lay-up and computer means for controlling movement of said free end based on said weights of said discrete lengths of lay-up to control the rate of discharge per unit movement of said free end to provide the desired distribution by weight of said strands on said means for collecting as said free end moves between its extended position and its retracted position.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
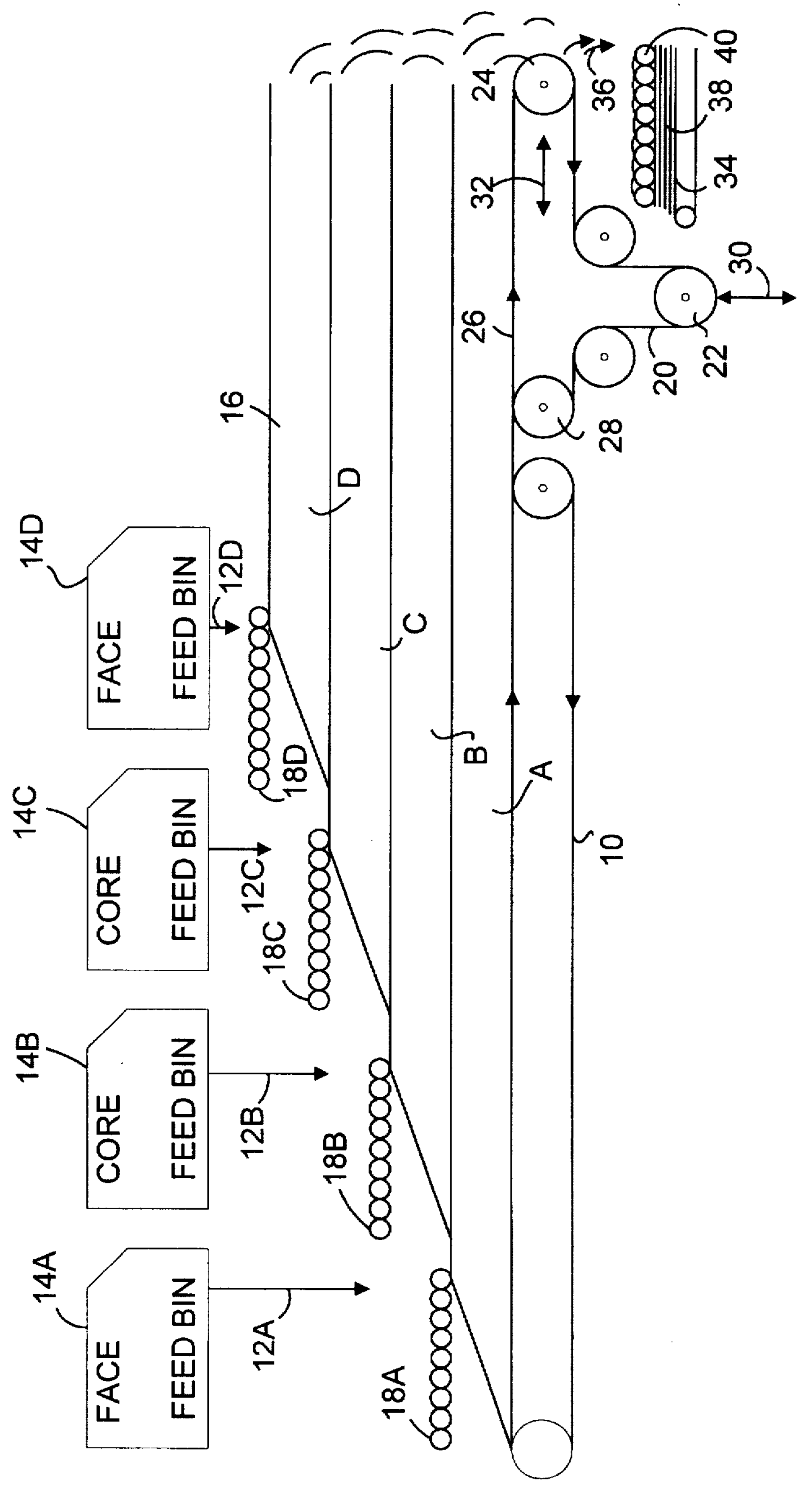
FIG. 1 is a schematic side elevation view of a basic form of the present invention.

The system shown in FIG. 1 shows a collecting and receiving conveyor 10 that receives strands or the like as indicated by the arrows 12 from a plurality of feed bins or lay-up heads 14, in the illustration four are shown (there may be fewer or more) and are indicated at 14A, 14B, 14C and 14D. The strands from these bins or lay-up heads 14A, 14B, 14C and 14D form layers A, B, C and D respectively of the layered mat or lay-up 16.

Preferably, each of the feed bins 14 will direct the strands through an orienter schematically indicated at 18 (A, B, C and D respectively).

Thus, each of the bins 14A, B, C and D preferably deposits strands as represented by arrows 12A, B, C and D through an orienter 18A, B, C and D respectively onto the conveyor 10 to form the layers A, B, C and D respectively of the stratified or layered lay-up 16. Each of the layers A, B, C and D is preferably oriented in a desired direction. The lay-up 16 is then transferred to a distributing conveyor 20 which wraps around a plurality of rolls including a movable dancing roll 22 and a movable front or nose roll 24 movement of which adjusts the length of the upper reach 26 of the conveyor 20 between the rolls 28 and 24 thereby changing the effective length of the conveyor 20. Suitable means schematically illustrated by the arrows 30 and 32 impart the required movement to the rolls 22 and 24 respectively and thereby adjust the effective length of the conveyor and the location of the off feed point (roll 24) relative to a collecting surface 34.

The collecting surface or conveyor 34 onto which strands leaving the free end of the conveyor are dropped as indicated by the arrows 36 is positioned below the free end roller 24. It will be apparent that as the roll 24 is moved to the left, the drop off or off feed point from the conveyor 20 above the platform or conveyor 34 is changing. It will further be noted that the front face of the lay-up 16 is dropping off the end of the conveyor 20, i.e. along the front of the roll 24 so that each of the layers A, B, C and D are mixed and deposited on the platform 34 over a corresponding incremental length of the final lay-up 38 formed on the collecting surface or platform 34.

When the end roller 24 reaches its extreme left hand position (retracted position 25 (see FIG. 2)), i.e. adjacent to the roll 28, the system may be operated in at least a couple of ways. One way is to advance the roll 24 preferably at a speed equal to the speed of the upper reach 26 of the conveyor so that in effect, the conveyor 26 and the roll 24 have essentially zero relative speed and since the roll 24 is advancing as fast as the layered lay-up 16, there is no movement of strands off of the conveyor 20 and onto the platform 34. This continues until the roll 24 reaches its extreme right hand position (extended position) 25 (see FIG. 2). This position 27 is sensed by any suitable movement such as sensor 70 (to be described below). The roll 24 then begins to move in the opposite direction, i.e. back towards the roll 28 and to disperse the strands from the lay-up 16 onto the final lay-up 38. The final lay-up 38 may be formed by collecting a number of different layers until the required thickness of the lay-up or feeding, for example, to a press, if one is making a strand board.

The timing of movement of the lay-up 38 when it is compiled to the required thickness preferably by removing the lay-up while the upper reach 26 of the conveyor 20 is being extended by moving the roll 24 from its extreme left-hand 25 position to its extreme right-hand extended position 27 and then commence the formation of a second lay-up 38 from this position.

When oriented strand board is being produced, it is preferred to provide a further or second orienter schematically illustrated at 40 to improve the alignment of the strands as they fall as indicated at 36 towards the collecting surface 34 so that the strands in the lay-up 38 are relatively accurately aligned.

The degree of alignment of the strands and the lay-up 38 is determined by the widths of the passages in the orienter 40 and the height of the orienter 40 from the upper surface of the partially formed lay-up 38 as the lay-up is being produced and is also significantly influenced by preorienting the strands via the orienters 18, i.e. if the strands in the layers A, B, C and D of the lay-up 16 are preoriented, the orienter 40 may be made with fewer decks since the orienters 18 have done a preorienting job, i.e. if the orienter 40 is an orienter as described for example in U.S. Pat. No. 5,487,460 issued Jan. 30, 1996 to Barnes because the strands and lay-up 16 have been at least partially oriented, the width of the top passages in the orienter 40 may be narrower and thus, it may be possible to reduce the number of decks required for a given orientation of the strands in the lay-up 38. To maintain a short spacing between the top of the lay-up 38 and the bottom of the orienter 40, the collecting surface is shifted away from the orienter 40 as each layer of the lay-up 38 is completed (as schematically indicated by the arrows 66 in FIG. 2).

Another mode of operation, the system to deposit strands on the receiving surface or conveyor 34 is to control the movement of the roll 24 in the manner different than that described above in that strands continue to be dispensed as the roll 24 at the rate the mat 16 is being advanced by the conveyor 20 less the movement of the roll 24 toward the extended position, i.e. when the roll 24 is moving. From the extended to the retracted position movement of the roll decreases the mount of weight of strands per unit area or length of the receiving surface 34, i.e. per square foot or per lineal foot. Similarly, increasing the velocity of the roll when dispensing strands and when movement of the roll is from the retracted to the extended position, decreases the number of strands dispensed per unit length of the receiving surface 34.

Dispensing strands when movement of the roll is alternatively in both directions, obviously simply doubles the number of layers for a given output from the receiving conveyor 10.

The calculation of the feed rate will be discussed in more detail hereinbelow.

It will be apparent that when the required height or thickness of lay-up 38 is obtained, it will still preferably be removed from the surface 34 as the roll 24 is being extended from its retracted to its extended position, preferably at a rate equal to the rate of movement of the upper reach 26 of the roll 24 so that no partial layer is formed during the removal.

Figure 2:
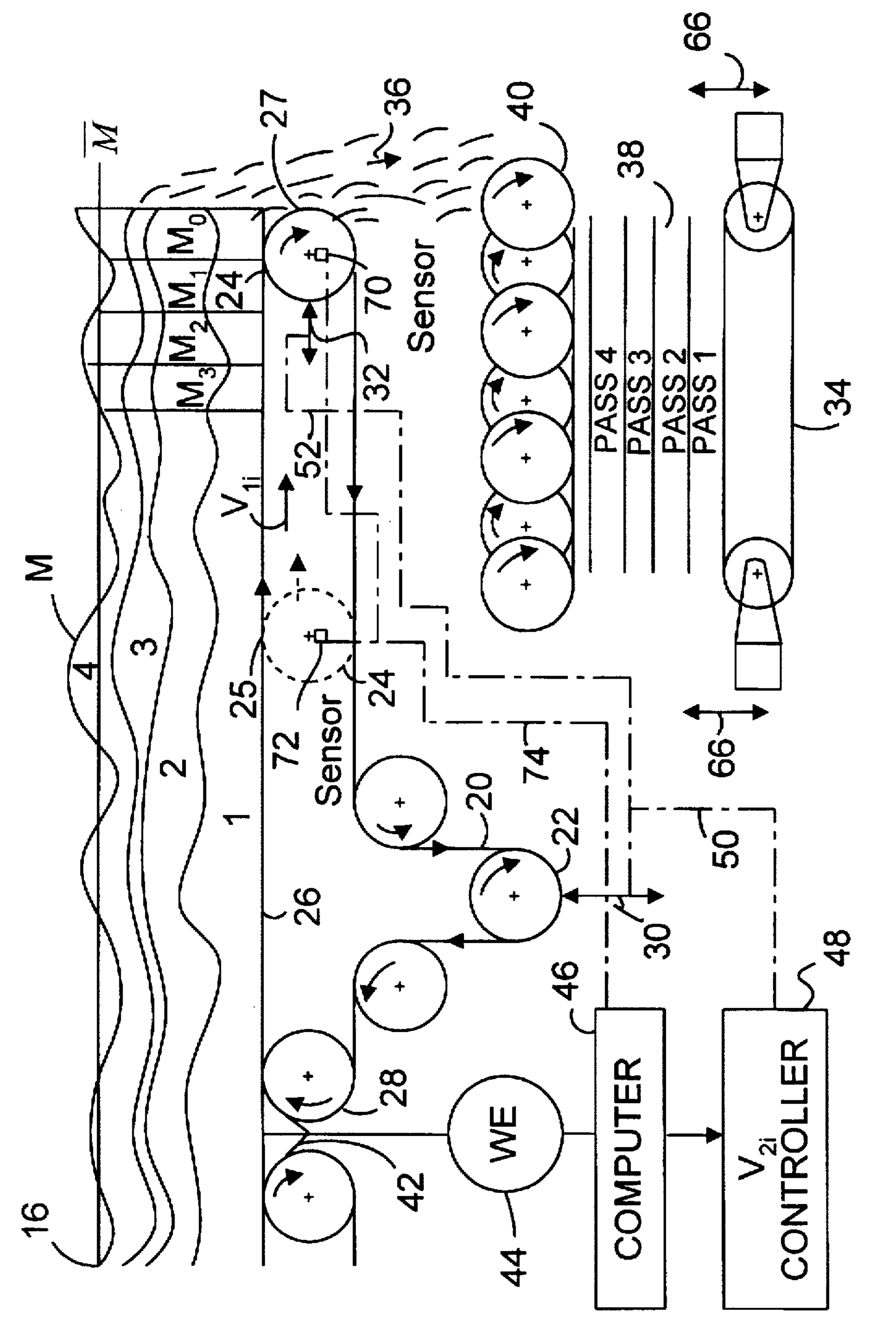
FIG. 2 is a schematic side elevation of a distributing conveyor including a computer control to minimize the density variations in the form lay-up.

In the preferred arrangement shown in FIG. 2, the mat or lay-up 16 is formed in essentially the same manner as described above. However, incremental lengths of the lay-up 16 are weighed as indicated at 42 to provide a weight indication 44 which is delivered to a computer 46 and operates a controller 48 to control the movements 30 and 32 of the rolls 22 and 24 respectively as indicated by the control lines 50 and 52.

The system illustrated in FIG. 2 is able to account for some fluctuation in the weight or density of the mat 16 along its length.

This is schematically represented in FIG. 2 by showing the curve M indicating the actual mass of the mat 16 along its length and $\overline{M}$ indicating the average or mean weight over preferably the full length from the weight scale 42 to the free end 24 with the roller 24 extended to the right as far as possible. It will be apparent that the instantaneous mass is indicated by the mass M0, M1, M2, M3 passing over the end of the conveyor 24 is dependent on the velocity of the belt indicated as $V_{1i}$ and the velocity of the roller 24 indicated as $V_{2i}$ and the distance over which the mass is deposited is based on $V_{2i}$ multiplied by the time increment.

Thus, the feed off the end of the moving roll 24 from the retracted position 25 toward the extended position 27 is equal to $$F_1=(V_{2i}+V_{1i})M_i \quad (1)$$

where $V_{1i}$=the velocity of the belt 20

$V_{2i}$=the velocity of the roll 24 toward the retracted position, i.e. toward the roll 28

$M_i$=the mass for the instantaneous increment of the mat 36 passing over the end of the roll 24 in lb/ft$^2$ and $F_1$=the rate of flow in lb/min of the strands on the belt 20.

It will be apparent that when movement of the roll 24 is from the retracted position 27 toward the extruded position 25, the velocity $V_{2i}$ is negative.

The amount of material deposited per unit length of the collecting surface 34 is determined by the formula $$F_2=F_1/V_{2i} \quad (2)$$

where $F_2$=flow per unit length, i.e. lb per lineal foot of the platform 34.

By substituting for $F_1$ in Equation (1), it is apparent that $F_2$ is equal to $$F_2=\frac{(V_{2i}+V_{1i})M_i}{V_{2i}} \quad (3)$$

which may be then manipulated to indicate the instantaneous set point value for $V_{2i}$ as a function of $M_i$ as follows:

$$V_{2i}=\frac{(M_iV_{1i})}{F_2-M_i} \quad (4)$$

It will be apparent that in the above described system, the velocity $V_{1i}$ will be substantially constant. $F_2$ represents the weight per unit length of strands received on the collecting surface 34 per pass or per layer being laid down which may be set as desired. Obviously, the velocity $V_{1i}$ and the rate of feed which determines the average flow rate of materials, i.e. $\overline{M}$ are related and if the mass flow on the conveyor $V_{1i}$ is too high for the desired weight to be applied per unit length of the receiving platform 34 the system will not work to deliver the required flow. Also, if the fluctuations are too steep, the instantaneous change of velocity of the roll 24 may have to be too great to obtain the desired result. If the flow rate and velocity $V_{1i}$ is too high, the movement of the roll 24 will reach a maximum and stay there. If the flow rate fluctuations are too rapid, i.e. too high in amplitude, the reaction of the roll 24 may not be sufficiently rapid to accommodate significant changes in mass on the conveyor 20. Generally, the mass flow rate on the conveyor 10 will be coordinated with the desired flow to the upstream equipment and to the density of the mat or lay-up 38 to be formed on the collecting surface 34.

On the other hand, if the flow rate on conveyor 10 is too slow, i.e. mass flow $\overline{M}$ is very low, the rate of movement of the roll 24 will simply be very slow and the production rate will be reflected accordingly. However, the mat formed on the receiving conveyor 34 will still have a relatively uniform weight profile near the desired $F_2$ lb per lineal foot.

Figure 3:
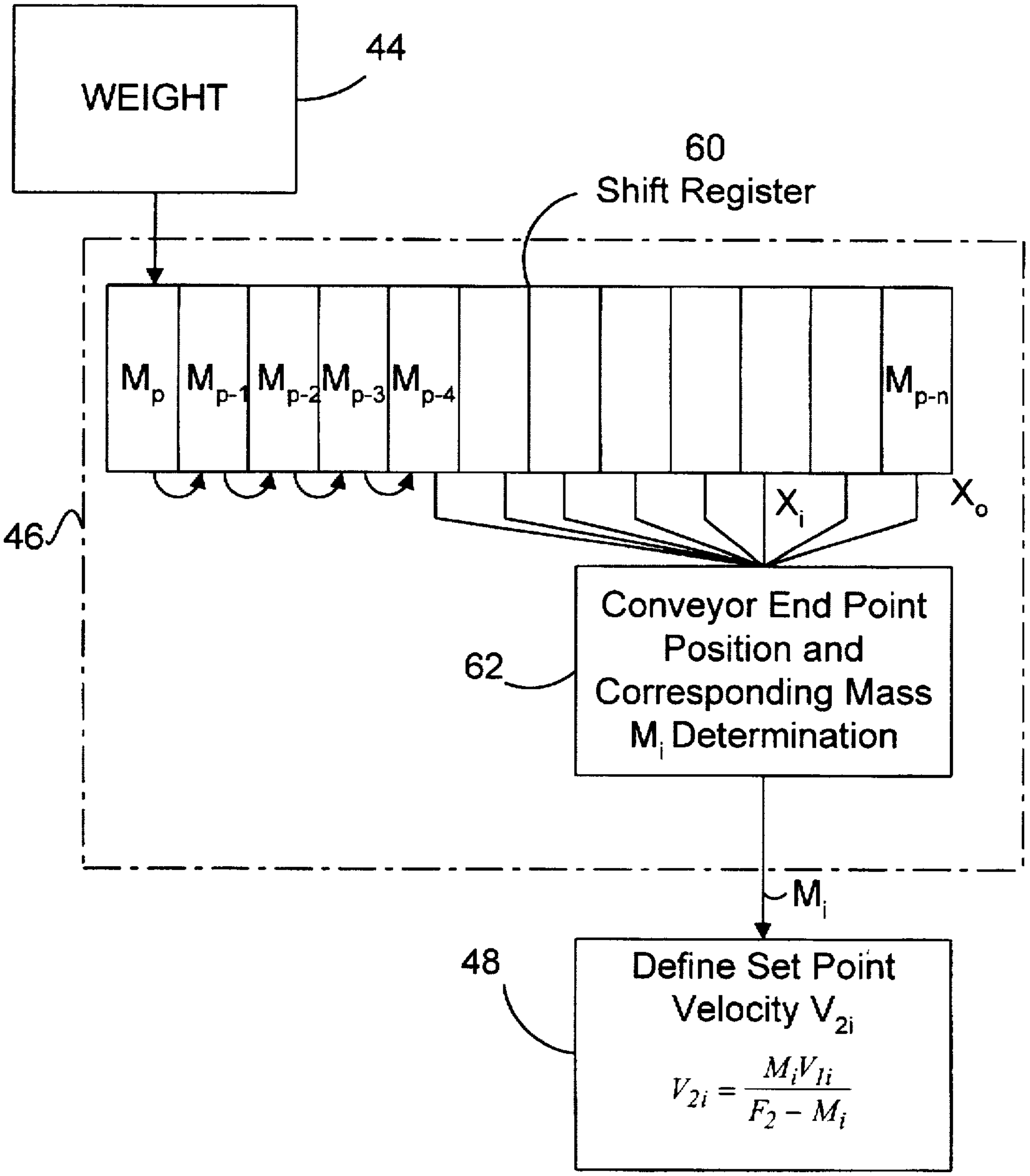
FIG. 3 is a schematic flow diagram for the system of FIG. 2.

To implement the above control, the weight scale 42 (or volume sensor) will determine the weight as indicated at 44 and input a shifting register 60 with the various incremental weights $M_p$, $M_{p-1}$, $M_{p-2}$, . . . $M_{p-n}$ etc. of the mat 16 measured, for example, as pounds per incremental length along the upper surface or reach 26 of the conveyor 20 (see FIGS. 2 and 3) in sequence and recorded as measured.

The location of the roll 24 may be determined in a number of different ways. The sensor 70 determines when the roll 24 is in extended position and this information may be used as a base position of the roller 24 over the surface 34 and the position is calculated as the roll 24 is moved relative thereto. If desired, a second sensor 72 may be provided to determine and notify the computer controller 46 that the roll 24 is in retracted position. The position of the roll 24 is determined as indicated at 62 based on input from the sensors 70 (and/or 72) via line 74, the velocity $V_{2i}$ and elapsed time from the base point 72 to give distance from the base point and thus, the location of roll 24, i.e. the then current position $L_i$. The corresponding measured mass per unit length of the mat $M_i$ at location $L_i$ is known since the particular register at the location $L_i$ is known and the mass $M_i$ is inputed to the velocity $V_{2i}$ set point control 48.

The shifting register 60 shifts to the next register in the sequence based on the velocity $V_{1i}$ of the conveyor 20, i.e. velocity $V_{1i}$ after the time to travel the distance d equivalent to the length on conveyor 20 of one register or increment $M_i$ of weight, i.e.

$$d=\int_0^t V_{1i}dt$$

The position of Mi on conveyor 20 is deemed calculated based on velocity $V_{1i}$ and time and position of the end point 24 by velocity $V_{2i}$ and time or each may be individually sensed or determined by encoders or the like.

The set point velocity control 48 is operated in accordance with Equation (4) to define the set point velocity $V_{2i}$ that will dispense the required mount of material off the end of the conveyor 20 adjacent to the roll 24 over a selected length of the collecting conveyor or surface 34 to obtain the required amount or weight of material per lineal foot of the surface 34.

It will be apparent that the above system normally lays down a number of different layers as indicated by Pass 1, Pass 2, Pass 3, Pass 4, to produce the required thickness of mat 38. To do this and maintain maximum alignment, it is preferred to move the platform 34 as indicated by the arrow 66 to maintain space between the top of the mat 38 and the lower edge of the orienter 40 small so that the strands falling from the orienter do not lose too much of their orientation.

The collecting conveyor, when a lay-up is completed, must remove the lay-up and be in position to collect the first layer of the next lay-up in the time the roll 24 is moving to extended position 27.

The above description has dealt primarily with the dispensing of material while roll 24 moves toward the roll 28. If desired, and as above described, by setting $V_{2i}$ as a negative value, when the roll 24 is moving from retracted 25 to extended position 27, the system may be operated to dispense the required amount of material per unit length of the receiving conveyor 34 as the roll 24 is moved from its left hand position 25 to its extreme right hand position 27. Thus, the system may lay the mat 38 either with the roll 24 moving to the left or to the right or both to provide layers of the desired density as set by the value $F_2$.

The above description has also been directed to weight, it could equally well be applied to volume by using a suitable sensor to sense the volume (height) of material on the conveyor 26 along incremental lengths and operate the control of the movement of the roll 24 to apply the appropriate volume at the appropriate location to form a lay-up with the desired volume at the selected locations along the collecting conveyor 34.

While the above description has primarily been concerned with forming a uniform distribution on the collecting conveyor 34, it will be apparent that, for example, if a non-uniform depth mold were to be filled, the movement of roll 24 could be programmed accordingly to distribute material as required to fill the mold, say, to a uniform height or level relative to the conveyor 26.

Having described the invention, modifications will be evident to those skilled in the art without departing from the scope of the invention as defined in the appended claims.

I claim:

1. A system for producing a lay-up of strands comprising a plurality of lay-up heads, a receiving conveyor for receiving a layer of strands formed by each of said lay-up heads to produce a layered lay-up, a distributing conveyor having a variable length upper reach terminating at a free end, means to move said free end from an extended position to a retracted position and to discharge lengths of said layered lay-up off said free end and to deposit said selected lengths over selected distances and means for collecting said strands discharging from said free end of said distributing conveyor.

2. A system as defined in claim 1 further comprising an orienter means between said distributing conveyor and said means for collecting to orient said strands of said lengths passing from said distributing conveyor to said means for collecting.

3. A system as defined in claim 1 further comprising a preorienter interposed between each of said lay-up heads and said receiving conveyor to orient said strands before they fall on said receiving conveyor.

4. A system as defined in claim 2 further comprising a preorienter interposed between each of said lay-up heads and said receiving conveyor to orient said strands before they fall on said receiving conveyor.

5. A system as defined in claim 1 further comprising means for weighing discrete lengths of said layered lay-up and computer means for controlling movement of said free end based on said weights of said discrete lengths to control the rate of discharge per unit of movement of said free end to provide the desired distribution by weight of said strands on said means for collecting as said free end moves between its extended position and its retracted position.

6. A system as defined in claim 2 further comprising means for weighing discrete lengths of said layered lay-up and computer means for controlling movement of said free end based on said weights of said discrete lengths to control the rate of discharge per unit of movement of said free end to provide the desired distribution by weight of said strands on said means for collecting as said free end moves between its extended position and its retracted position.

7. A system as defined in claim 3 further comprising means for weighing discrete lengths of said layered lay-up and computer means for controlling movement of said free end based on said weights of said discrete lengths to control the rate of discharge per unit of movement of said free end to provide the desired distribution by weight of said strands on said means for collecting as said free end moves between its extended position and its retracted position.

8. A system as defined in claim 4 further comprising means for weighing discrete lengths of said layered lay-up and computer means for controlling movement of said free end based on said weights of said discrete lengths to control the rate of discharge per unit of movement of said free end to provide the desired distribution by weight of said strands on said means for collecting as said free end moves between its extended position and its retracted position.

9. A system as defined in claim 5 wherein said weights of discrete lengths are held in a shifting register and the position of said free end and a corresponding position of said discrete lengths are determined and the weight in said corresponding position is used to define the velocity of said free end.

10. A system as defined in claim 6 wherein said weights of discrete lengths are held in a shifting register and the position of said free end and a corresponding position of said discrete lengths are determined and the weight in said corresponding position is used to define the velocity of said free end.

11. A system as defined in claim 7 wherein said weights of discrete lengths are held in a shifting register and the position of said free end and a corresponding position of said discrete lengths are determined and the weight in said corresponding position is used to define the velocity of said free end.

12. A system as defined in claim 8 wherein said weights of discrete lengths are held in a shifting register and the position of said free end and a corresponding position of said discrete lengths are determined and the weight in said corresponding position is used to define the velocity of said free end.

* * * * *